No. 717,409. Patented Dec. 30, 1902.
H. F. JEFFS.
CHANGEABLE SPEED GEAR.
(Application filed May 27, 1902.)
(No Model.) 2 Sheets—Sheet 1.
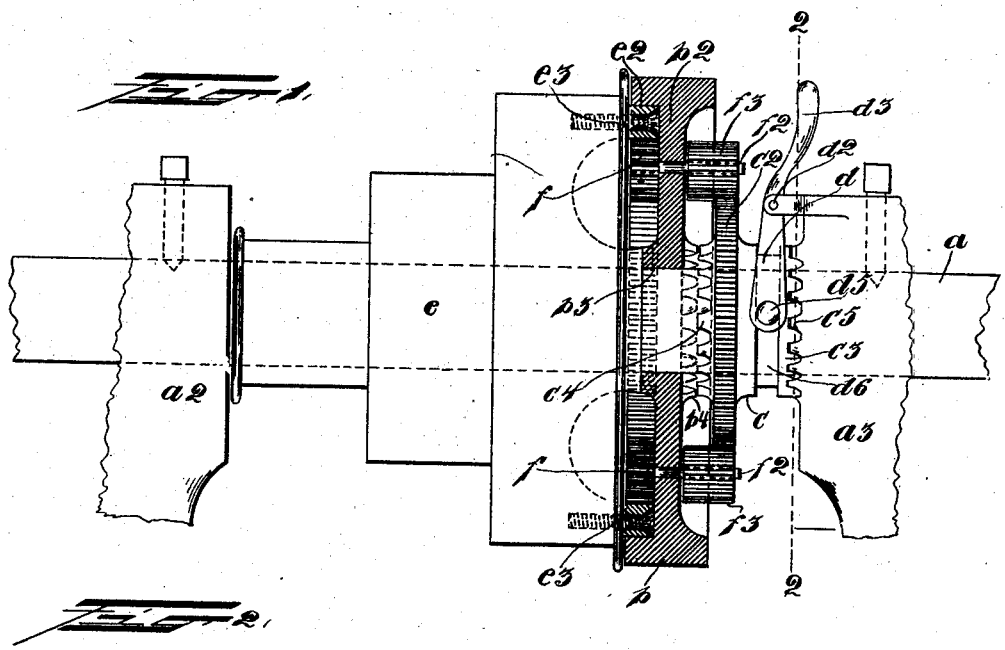
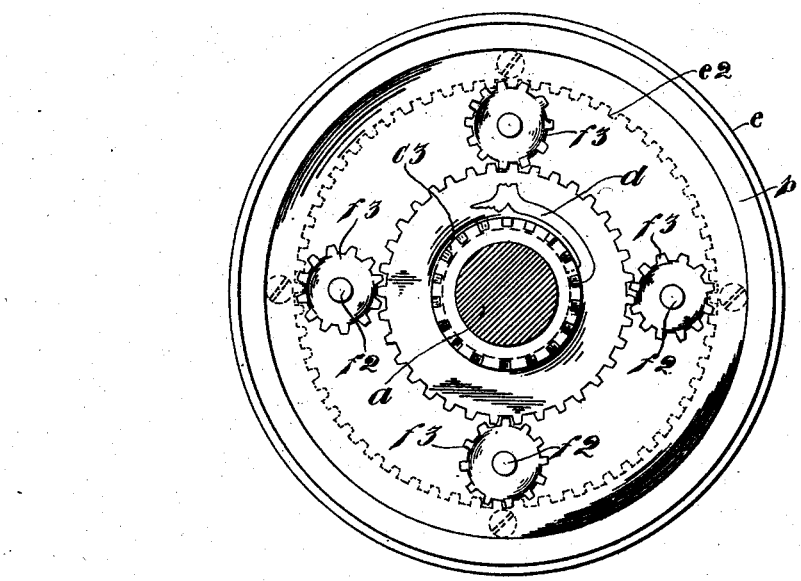
WITNESSES
INVENTOR
Henry F. Jeffs
BY
Edgar Tate & Co
ATTORNEYS No. 717,409. Patented Dec. 30, 1902.
H. F. JEFFS.
CHANGEABLE SPEED GEAR.
(Application filed May 27, 1902.)
(No Model.) 2 Sheets—Sheet 2.
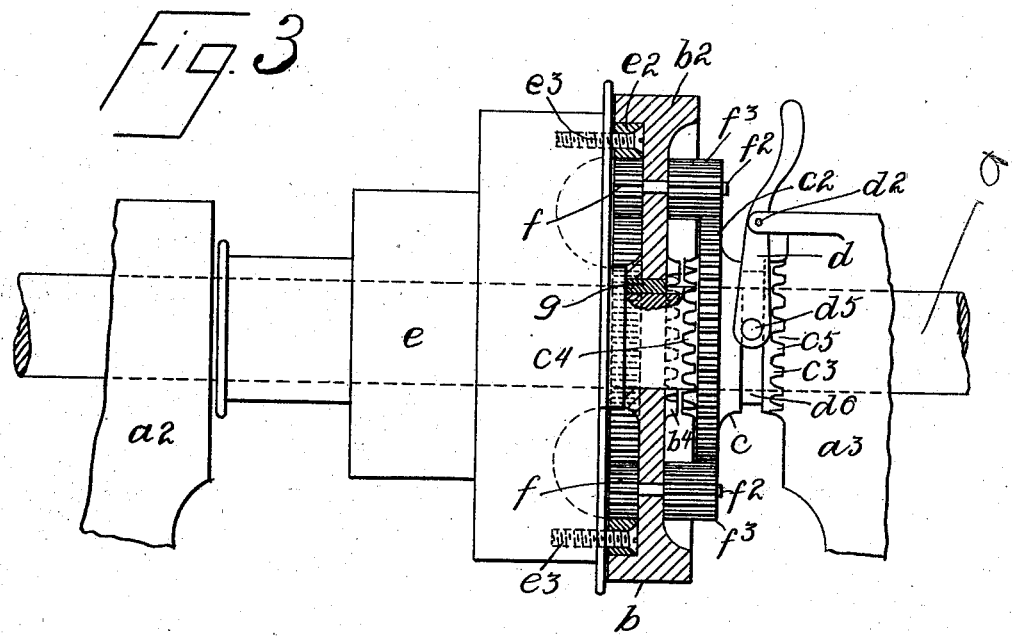
INVENTOR
Henry F. Jeffs

UNITED STATES PATENT OFFICE.

HENRY F. JEFFS, OF BROOKLYN, NEW YORK.

CHANGEABLE-SPEED GEAR.

SPECIFICATION forming part of Letters Patent No. 717,409, dated December 30, 1902.

Application filed May 27, 1902. Serial No. 109,137. (No model.)

*To all whom it may concern:*

Be it known that I, HENRY F. JEFFS, a citizen of the United States, residing at Brooklyn, in the county of Kings and State of New York, have invented certain new and useful Improvements in Changeable-Speed Gears for Lathes, of which the following is a full and complete specification, such as will enable those skilled in the art to which it appertains to make and use the same.

The object of this invention is to provide an improved changeable-speed gear for use in connection with lathes, power-shafts, or in connection with any other device to which the same may be applied; and with these and other objects in view the invention consists in a changeable-speed gear constructed as hereinafter described and claimed.

The invention is fully described in the following specification, of which the accompanying drawings form a part, in which the separate parts of my improvement are designated by the same reference characters in each of the views, and in which—

Figure 1 is a sectional side view of a lathe-shaft provided with my improvement; Fig. 2, a partial section on the line 2 2 of Fig. 1; and Fig. 3, a view similar to Fig. 1, showing a modification.

In the drawings forming part of this specification I have shown at $a$ an ordinary lathe or other shaft, which is horizontally mounted in supports $a^2$ and $a^3$, or this shaft may be supported in any desired manner, and in the form of construction shown in the drawings the shaft $a$ is stationary. Loosely mounted on the shaft $a$ is a power-wheel $b$, which may be an ordinary belt-wheel or a gear-wheel, and this wheel is provided with a central web portion $b^2$, having a hub $b^3$, provided on its right-hand side with a clutch $b^4$, and mounted on the shaft $a$ at the right of the wheel $b$ is a clutch-hub $c$, provided with a gear $c^2$ and with a right-hand clutch $c^3$ and a left-hand clutch $c^4$.
The clutch $c^3$ operates in connection with a corresponding clutch $c^5$, with which the support $a^3$ of the shaft $a$ is provided, and the clutch $c^4$ operates in connection with the clutch $b^4$ on the wheel $b$.

The clutch-hub $c$ may be moved longitudinally of the shaft $a$ by means of a yoke $d$, pivotally supported at $d^2$ and provided with a handle $d^3$, said yoke being provided with pins $d^5$, which operate in an annular groove $d^6$, formed in the clutch-hub $c$.

At the left of the wheel $b$ is a cone-pulley $e$, the face of which adjacent the wheel $b$ is provided with an annular internal gear $e^2$, which is secured thereto in the form of construction shown by screws $e^3$; but this annular gear may be secured to the cone-pulley in any desired manner and may be formed integral therewith. The web or body portion of the wheel $b$ is provided on the side thereof adjacent the cone-pulley $e$ with a plurality of pinions $f$, two of which are shown, but any desired number of which may be employed. These pinions are secured to shafts $f^2$, which pass through the wheel $b$ or the central or web portion thereof and the ends of which are provided on the right-hand side of said wheel with elongated pinions $f^3$, four of which are shown, and the number of these pinions will correspond with the number of the pinions $f$.

In the form of construction shown in Figs. 1 and 2 the wheel $b$, clutch-hub $c$, and cone-pulley $e$ are all loosely mounted on the shaft $a$, and if the clutch-hub $e$ be in the position shown in Fig. 1, in which the clutch $e^3$ engages the clutch $c^5$, the said clutch-hub will be stationary, and if power be applied to the cone-pulley $e$ the wheel $b$ will be turned at a speed less than that of said pulley; but if the clutch-hub $c$ be moved to the left, so that the clutch $e^4$ will engage the clutch $b^4$, the parts $c$, $b$, and $e$ will all revolve together at the same speed, and it will be apparent that power may be transmitted from the wheel $b$ for any desired purpose.

In Fig. 3 I have shown a modification in which the shaft $a$ is movable in its supports, and the wheel $b$ is keyed to said shaft, as shown at $g$, and the speed of the shaft will be greater or less, according to the position of the clutch-hub $c$, and the power will be transmitted by the cone-pulley $e$.

Having fully described my invention, what I claim as new, and desire to secure by Letters Patent, is—

In a device of the class described, a stationary support, a shaft mounted therein, a power-wheel mounted thereon, a clutch-hub mounted between said support and said wheel and movable longitudinally of said shaft and adapted to engage both the support and the said wheel and provided with a gear, a cone-pulley on said shaft opposite the clutch-hub and provided with an internal annular gear, shafts passing through the power-wheel and pinions connected with the opposite ends of said shafts, the pinions on one end of said shafts being adapted to engage said internal gear, and the pinions on the other end of said shafts being adapted to engage the gear on the clutch-hub, substantially as shown and described.

In testimony that I claim the foregoing as my invention I have signed my name, in presence of the subscribing witnesses, this 24th day of May, 1902.

HENRY F. JEFFS.

Witnesses:
F. A. STEWART,
C. E. MULREANY.